United States Patent
Roger et al.

(10) Patent No.: US 12,198,557 B2
(45) Date of Patent: Jan. 14, 2025

(54) DEVICE AND METHOD FOR MANAGING AIRCRAFT SYSTEMS

(71) Applicant: THALES, Courbevoie (FR)

(72) Inventors: Michel Roger, Toulouse (FR); Hervé Goutelard, Toulouse (FR); Christophe Pierre, Toulouse (FR)

(73) Assignee: THALES, Courbevoie (FR)

( * ) Notice: Subject to any disclaimer, the term of this patent is extended or adjusted under 35 U.S.C. 154(b) by 610 days.

(21) Appl. No.: 17/414,902

(22) PCT Filed: Dec. 19, 2019

(86) PCT No.: PCT/EP2019/086473
§ 371 (c)(1),
(2) Date: Jun. 16, 2021

(87) PCT Pub. No.: WO2020/127841
PCT Pub. Date: Jun. 25, 2020

(65) Prior Publication Data
US 2022/0068148 A1 Mar. 3, 2022

(30) Foreign Application Priority Data
Dec. 20, 2018 (FR) ..................................... 1873498

(51) Int. Cl.
*G08G 5/00* (2006.01)
*G01C 21/20* (2006.01)

(52) U.S. Cl.
CPC ........... *G08G 5/0039* (2013.01); *G01C 21/20* (2013.01); *G08G 5/006* (2013.01)

(58) Field of Classification Search
CPC .... G08G 5/0039; G08G 5/006; G08G 5/0021; G08G 5/0034; G08G 5/0091; G01C 21/20; G01C 21/3461; G01C 21/3469; G01C 23/00; G01C 21/3446
See application file for complete search history.

(56) References Cited

U.S. PATENT DOCUMENTS

| | | | |
|---|---|---|---|
| 6,314,362 B1 * | 11/2001 | Erzberger | G08G 5/0043 340/961 |
| 2008/0288164 A1 | 11/2008 | Lewis et al. | |
| 2010/0198433 A1 | 8/2010 | Fortier et al. | |
| 2018/0268720 A1 * | 9/2018 | Sharma | G05D 1/101 |

\* cited by examiner

*Primary Examiner* — Yuen Wong
(74) *Attorney, Agent, or Firm* — BakerHostetler (57) ABSTRACT

A computer-implemented method for optimizing a mission of an aircraft, the aircraft having a predefined flight plan between a starting point and an arrival point, the flight plan comprising a set of waypoints. The method comprises steps of: calculating, for the aircraft, a reference trajectory between the starting point and the arrival point, the reference trajectory comprising a set of segments and of intermediate points linking the segments of the reference trajectory; defining a search area in the reference trajectory between an initial position and a final position to be reached for this area; determining, in the search area, all possible shortcuts between the initial position and the final position, a shortcut being able to take into account any type of point, points of the flight plan and/or intermediate points of the reference trajectory; and identifying the combination of shortcuts corresponding to an optimum path according to an optimization criterion, the optimum path optimizing the mission of the aircraft in the search area.

13 Claims, 7 Drawing Sheets

DEVICE AND METHOD FOR MANAGING AIRCRAFT SYSTEMS

CROSS-REFERENCE TO RELATED APPLICATIONS

This application is a National Stage of International patent application PCT/EP2019/086473, filed on Dec. 19, 2019, which claims priority to foreign French patent application No. FR 1873498, filed on Dec. 20, 2018, the disclosures of which are incorporated by reference in their entirety.

FIELD OF THE INVENTION

The invention relates to the field of the management of aircraft systems. The invention relates in particular to a device and to a method for optimizing a mission of an aircraft.

BACKGROUND

In modern on-board aircraft management systems, there is no method that makes it possible to automatically manage and optimize the mission of an aircraft.

This task is carried out mainly on the ground at the mission preparation stage, and sometimes during the course of the mission via the operations center of the airline when it has one.

Some mission management and optimization assistance solutions are offered, such as:
- Boeing's "Direct Routes" service, which allows information to be communicated directly to the operations center and to the crew during a mission whenever an alternative route that is more economical in terms of consumption is available;
- NASA's TAP ("Traffic Aware Planner") system, which makes it possible to propose an alternative route that is more fuel-efficient and time-saving based on the analysis of the current position of the aircraft and its flight plan;
- patent U.S. Pat. No. 6,314,362 B1 by H. Erzberger et al. proposes an automatic air traffic control assistance system for air traffic controllers. The principle consists in identifying all aircraft flying on inefficient routes, and then in determining whether it is possible to save time by bypassing certain route segments, and in determining whether optimized routes are available without conflict with other aircraft. A graphical interface (GUI) is used to allow the air traffic controller to send the aircraft directly to a waypoint or bring it closer to the destination airport with a simple "point and click" action.
- patent US20100198433 belonging to the applicant proposes an on-board solution for optimizing the lateral route, based on the "DIR TO" function of the flight management system, in order to propose a local modification of the flight plan. This solution is limited to the data available on board (navigation database, aircraft performance) and atmospheric conditions (wind).

However, regardless of the solution, all of the requirements of a mission are not all considered at the same time so as to optimize a trajectory. There is therefore a need for a solution for optimizing an aircraft flight plan that continually takes into account all of the fixed and changing constraints that exist on the way-points of the flight plan and that impact the mission of the aircraft. The present invention addresses this need.

SUMMARY OF THE INVENTION

One subject of the present invention is a method for, in general terms, optimizing the mission of an aircraft, and more particularly for optimizing a flight plan during a mission. The term aircraft in the present description is understood to be a means of transport capable of moving within the Earth's atmosphere. For example, an aircraft may be an airplane or a helicopter. The aircraft comprises a piloting cabin or a cockpit containing piloting equipment (called avionic equipment, certified by the aeronautical regulator) and optional equipment (called non-avionic or "open world" equipment). Avionic systems may notably comprise human-machine interfaces HMI or human-system interfaces HSI, one or more aircraft flight management systems, and one or more mission management systems.

Another subject of the present invention is a device for aiding the optimization of the mission of an aircraft.

In one embodiment for the avionics sector, the present invention proposes a method for automatically searching for shortcuts formed by segments between any type of waypoint belonging to a flight plan and/or belonging to a reference trajectory.

In order to achieve the desired results, methods, devices and a computer program product are thus claimed according to various embodiments.

In particular, what is proposed is a computer-implemented method for optimizing a mission of an aircraft, the aircraft having a predefined flight plan between a starting point and an arrival point, the flight plan comprising a set of waypoints. The method comprises steps of:
- calculating, for the aircraft, a reference trajectory between the starting point and the arrival point, the reference trajectory comprising a set of segments and of intermediate points linking the segments of the reference trajectory;
- defining a search area in the reference trajectory between an initial position and a final position to be reached for this area;
- determining, in said search area, all possible shortcuts between the initial position and the final position, a shortcut being able to take into account any type of waypoint, points of the flight plan and/or intermediate points of the reference trajectory; and
- identifying the combination of shortcuts corresponding to an optimum path according to an optimization criterion, said optimum path optimizing the mission of the aircraft in said search area.

According to some embodiments of the method, as an alternative or in combination:
- the step of determining all of the shortcuts consists in constructing a graph comprising a set of nodes and arcs, the nodes representing crossing points between the initial position and the final position of the search area, the arcs representing the possible shortcuts.
- the initial position of the search area is the current position of the aircraft.
- the step of constructing a graph comprises at least a step of discretizing the reference trajectory in the search area and a step of deleting all of the shortcuts that intersect areas to be avoided.
- the step of identifying the optimum path consists in applying a shortest path algorithm to the graph.
- the shortest path algorithm is a Dijkstra algorithm.
- the search area is a space corresponding to an air traffic control sector or to an area defined between two characteristic points of the flight plan or to a space between two points chosen by an operator.

the method furthermore comprises a step of calculating the costs brought about by the various paths.

the optimization criterion is a single criterion, notably a criterion for optimizing fuel consumption or a criterion for optimizing time or a criterion for optimizing distance.

the optimization criterion is a multiple criterion taking into account various costs.

the method additionally comprises a step of displaying the optimum path.

The invention also covers a computer program product, said computer program comprising code instructions for performing the steps of the claimed method when the program is executed on a computer.

The invention additionally covers a device for optimizing a mission of an aircraft, the aircraft having a predefined flight plan between a starting point and an arrival point, the flight plan comprising a set of waypoints, the device comprising:

means for calculating a reference trajectory between the starting point and the arrival point, the reference trajectory comprising a set of segments and of intermediate points linking the segments of the reference trajectory;

means for defining a search area in the reference trajectory between an initial position and a final position to be reached for this area;

means for determining, in said search area, all possible shortcuts between the initial position and the final position, a shortcut being able to take into account any type of point, points of the flight plan and/or intermediate points of the reference trajectory; and means for identifying the combination of shortcuts corresponding to an optimum path according to an optimization criterion, said optimum path optimizing the mission of the aircraft in said search area.

Another subject of the invention is a flight management system for an aircraft, comprising a device as claimed.

BRIEF DESCRIPTION OF THE DRAWINGS

Various aspects and advantages of the invention will appear in support of the description of one preferred, but non-limiting, implementation of the invention, with reference to the figures below in which.

DETAILED DESCRIPTION

When an airplane makes a journey between two airports, a flight plan (FPLN) is filed in order to inform the air navigation services thereof. Said flight plan contains all specified information with regard to the proposed flight or part of the flight, and notably:

the type of airplane;
the departure time
the first flight level requested for cruising;
the on-board equipment;
the planned route.

The flight plan between a starting point and an arrival point to be reached contains a set of waypoints (WPT) ordered in a predetermined manner, wherein a change in heading or altitude or speed has to take place at each waypoint. A waypoint is defined by a geographical position and latitude and longitude coordinates. All of these points may be chosen from among predefined points in a navigation database that may correspond to airports, radio navigation beacons, etc.

To follow its flight plan, an airplane uses a flight management system (FMS). The FMS is an on-board navigation assistance system that integrates information about the performance of the aircraft and about its position, information from navigation sensors, from the flight plan that is stored and from manual inputs. Its purpose is to assist pilots by providing piloting instructions via a suitable human-machine interface, or to allow the airplane to be guided automatically along the trajectory when it is coupled to the autopilot. In order to guide the aircraft so as to follow its flight plan, the FMS uses various sensors to determine the current position of the aircraft (PPOS) and the accuracy of this position. The accuracy is defined as the degree of conformity between the estimated, measured or desired position and the actual position of the aircraft at a given time. The FMS also allows the pilot to modify the flight plan, during the flight, for various reasons, such as a delay caused by poor atmospheric conditions to be avoided, or by requests imposed by the air traffic management (ATM) authorities. The FMS regularly calculates a lateral trajectory based on the points of the flight plan. The FMS also calculates a vertical profile based on the cruising level and the altitude constraints. The FMS calculates a speed profile based on the speed constraints and the optimized speeds of each flight phase and according to a cost index that is chosen by the airline. Taking into account the flight plan and the position of the airplane, the FMS calculates the reference trajectory to be followed, which is a sequence of straight and curved segments. The points linking the segments of the reference trajectory may correspond to waypoints of the flight plan or may be different.

Figure 1:
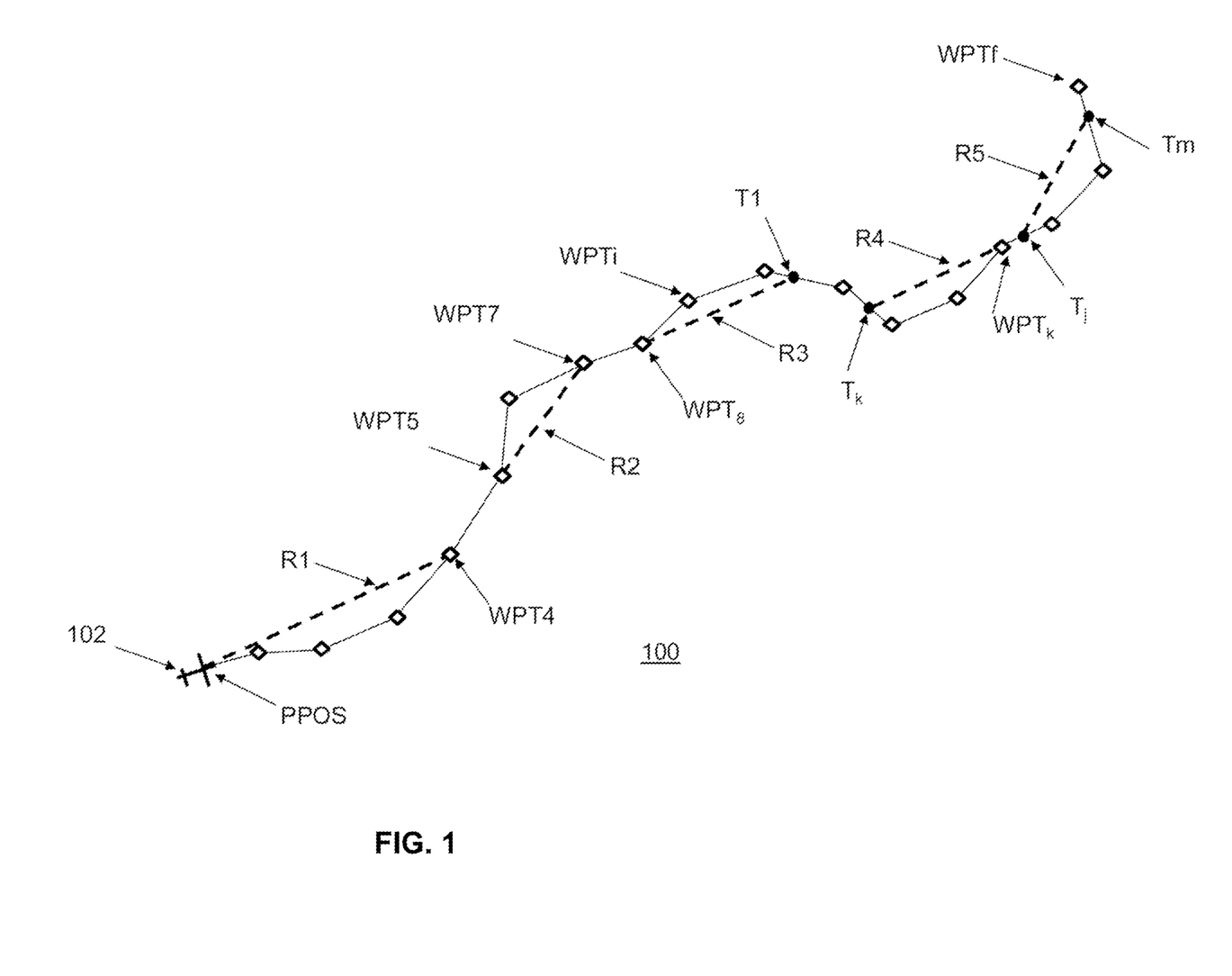
FIG. 1 illustrates types of shortcut with waypoints of the flight plan and intermediate points of a reference trajectory, on a portion of a lateral trajectory between an initial position of an aircraft (PPOS) and a final position (WPT$_f$)

FIG. 1 illustrates a portion of a lateral trajectory between an initial position, illustrated in the example by a point corresponding to the current position (PPOS) of the aircraft, and a final position, illustrated by a final waypoint WPT$_f$. Each point of the flight plan (WPT$_1$, WPT$_2$, ..., WPT$_i$, ..., WPT$_f$) is represented on the portion under consideration by a diamond. The intermediate points (T$_1$, T$_2$, ..., T$_j$, ..., T$_m$) of the reference trajectory are represented by filled circles.

Optimizing a trajectory consists in looking for a trajectory that minimizes costs, considering the price of fuel, operating costs, the costs of a delay on arrival, the costs of flying over airspaces, the weather conditions (temperature, atmospheric pressure, wind speed and direction, disruptions, etc.), prohibited areas (military areas, turbulence, etc.) and speed and altitude limitations in certain regions.

To achieve this, in general, the present invention proposes a method for automatically searching for shortcuts, taking into account any type of point, points of a reference trajectory and/or points of a flight plan, and for determining the combination of multiple shortcuts that makes the trajectory optimum.

FIG. 1 thus for example shows various types of shortcut (R1 to R5) such as:

R1 illustrates a shortcut between the initial position (in the example the current position PPOS) of the aircraft and a point of the flight plan $WP^4$, R2 illustrates a shortcut between two points of the flight plan, $WPT_5$ and $WPT_7$, R3 illustrates a shortcut between a point of the flight plan $WPT_8$ and an intermediate point $T_1$ of the reference trajectory;

R4 illustrates a shortcut between an intermediate point Tk of the reference trajectory and a point of the flight plan WPTk;

R5 illustrates a shortcut between two intermediate points of the reference trajectory, $T_j$ and $T_m$.

The illustrated example is not limiting, and the principles of the invention apply to any variant of the flight portion in terms of the number of waypoints of the flight plan, points of the reference trajectory, initial position and final position.

A shortcut of the type R1 between the current position PPOS of the aircraft and a point of the flight plan corresponds to a segment that may be activated by the functionality known as "DIRTO" of an FMS, allowing direct access from the current position to the waypoint located downstream.

A shortcut of the type R2 between two points of the flight plan corresponds to a segment that may be activated by the functionality known as "NEXT WPT" of an FMS, making it possible to fly directly from one waypoint to another waypoint located downstream.

Those skilled in the art understand that shortcuts other than segments, such as for example circular arcs, are also shortcuts able to be used to implement the invention. Reference will be made to straight or curved segments.

Figure 2:
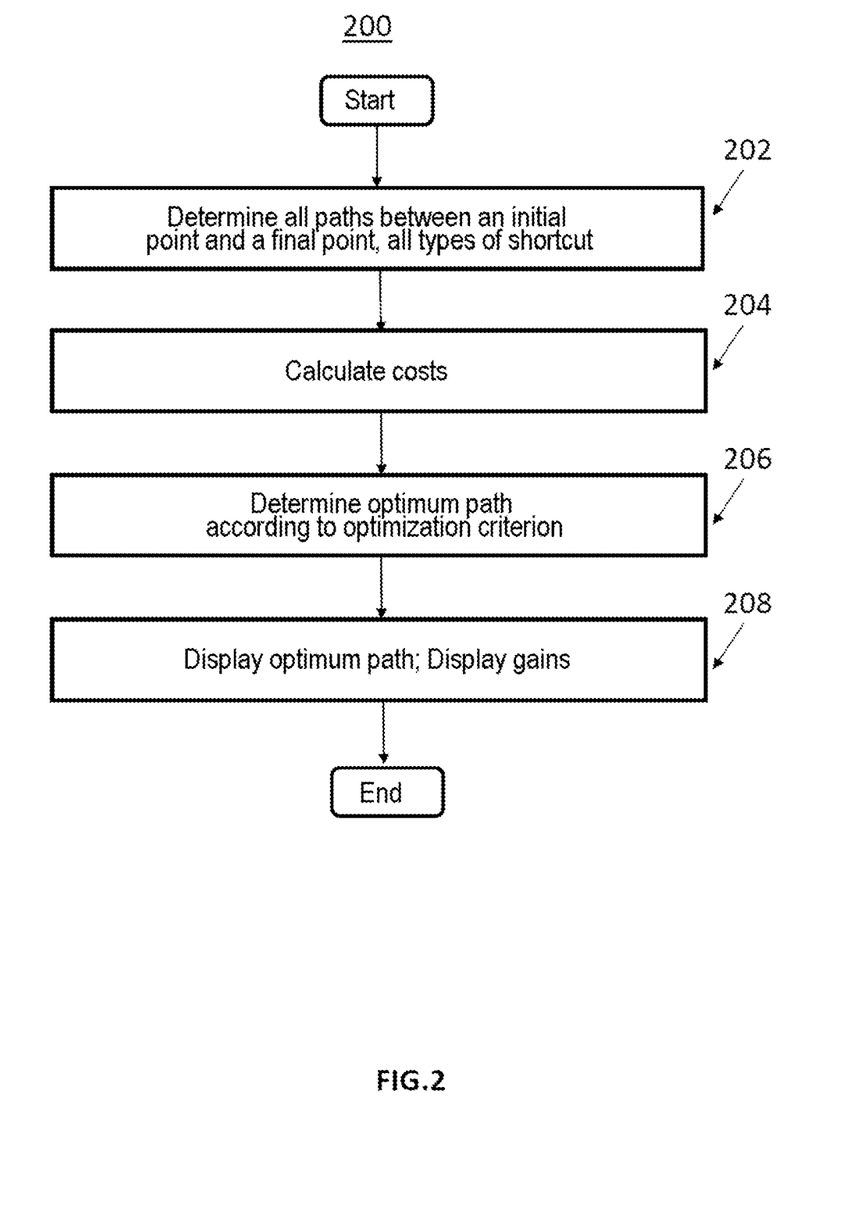
FIG. 2 shows general steps of the trajectory optimization method of the invention according to one embodiment.

The general method of the invention as illustrated by FIG. 2 makes it possible, in a first step (202), to determine all existing paths between an initial point and a final point by considering the combination of all possible shortcuts; and then to calculate (204) the costs brought about by the various paths; and then to determine (206) the path ("optimum path") that minimizes the cost of the trajectory according to a chosen optimization criterion.

In a subsequent step, the method makes it possible to display (208) the results—the optimum path and the gains achieved. The results are preferably displayed on an interface on board the aircraft in the form of a trajectory, for example for the optimum path.

A viewing interface may comprise one or more display screens. The invention advantageously makes it possible to take advantage of modern, reliable and robust human-machine interaction systems, and, according to some embodiments, the display means may be touch screens, force feedback-based, augmented reality-based and/or virtual reality-based. The display means may comprise or implement one or more devices such as virtual-reality headsets and/or augmented-reality glasses (for example "head-mounted display", "wearable computer", "glasses" or a video headset) and/or (for example holographic) projection devices. A virtual-reality headset worn by a pilot may be opaque or semi-transparent or have configurable transparency. The display may be a "head-up" display. The information may be displayed in one or more virtual-reality and/or augmented-reality headsets. The information may therefore be entirely virtual (displayed in an individual headset), entirely real (for example projected onto the flat surfaces available in the real environment of the cockpit of the aircraft) or a combination of the two (partly a virtual display superimposed on or merged with reality and partly a real display via projectors). The display may also be characterized by the application of predefined position rules and display rules. For example, the human-machine interfaces (or the information) may be "distributed" (divided into separate portions, which are possibly partially redundant, and then distributed) between the various virtual or real screens.

Once displayed, the pilot (or operator) may select the proposed new trajectory.

According to the embodiments, to determine the optimum path, the pilot may choose either a single optimization criterion (Fuel; Time; Distance) or a more complex function that takes into account various costs (Fuel+Cost Index× Time).

An optimum trajectory should avoid existing obstacles in an airspace, taking into account one or more given metrics (time, distance, fuel consumption, etc.). It is generally considered that an airspace contains critical areas such as areas with bad weather or congested areas, that is to say areas containing significant traffic. Optimizing a trajectory according to the method of the invention continually takes into account all of the constraints that will impact a mission, whether these are fixed constraints (criteria of an airline or of a client, characteristics and performance of the aircraft), constraints linked to ATM (taxes, characteristics, structures, rules of air traffic control (ATC) authorities of the various sectors, etc.) or changing constraints such as those linked to the environment (weather conditions, traffic congestion, no-fly zones) and uncertainties with regard to the forecasts of the change thereof.

Advantageously, the method of the invention makes it possible to calculate and propose optimized trajectories that are:

Efficient with regard to the expectations of a company/client;

Flyable;

Acceptable to ATC;

Safe;

Easy to handle in the cockpit; and

Associated with a confidence index in terms of the uncertainties with regard to the data that are used (notably forecasts).

FIGS. 3a to 3e detail the step (202) of determining all possible paths in a search area (302), for a portion of a lateral trajectory between an initial position, taken as the current position of an aircraft (PPOS) for the example described, and a final position $WPT_f$. A search area may correspond to various spaces, such as for example:

an air traffic control sector;

areas defined between two characteristic points of the flight plan (this could be between two points constrained in terms of position, speed and/or time, so as to guarantee that the method considers all of the constraints of the mission);

a space between two points chosen by the operator.

Returning to FIGS. 3a to 3e, these illustrate the steps for constructing a path graph, the graph comprising a set of nodes and arcs representative of all paths with possible shortcuts, calculated based on the flight plan data, on a reference trajectory and on fixed constraints. The graph makes it possible to represent all possible paths that are formed by combinations of shortcuts.

More precisely, the input data in step (202) consist of a list of way-points of the initial flight plan, a list of (straight and curved) segments of the reference trajectory, a discretization step to be applied and static constraints.

The static constraints to be taken into account generally incorporate:
- initial conditions: starting point (latitude, longitude, altitude, time, weight);
- final conditions: arrival point (latitude, longitude, altitude, time, weight);
- constraints regarding the optimum trajectory search area: either there is no constraint or the search may be carried out piecewise or in a control sector for example; and
- set areas to be avoided: such areas may be represented by 3D polygons (which may represent for example closed sectors).

The method of the invention, in the initial step (202), makes it possible to generate a graph whose nodes represent crossing points between a starting point and an arrival point. The nodes may be either points of the flight plan or intermediate points of the reference trajectory. The arcs of the graph represent possible shortcuts between the points in the search area. In one embodiment, it is possible to select and limit the types of shortcut to be taken into account to construct the graph.

Figure 3A:
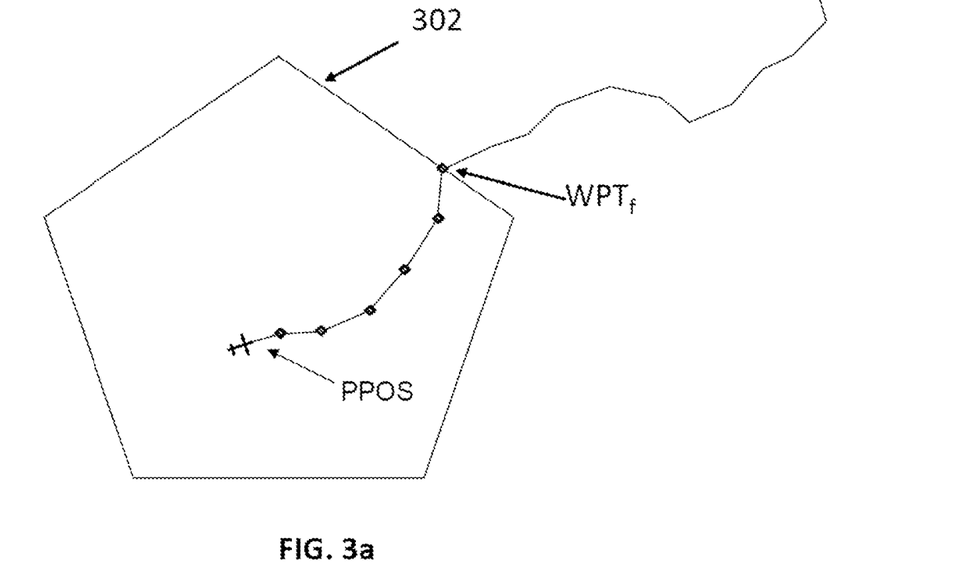
FIGS. 3a to 3e illustrate the construction of a path graph according to one embodiment.

As illustrated in FIG. 3a, the method begins, for an initial search area (302), between an initial position, here the current position of an aircraft (PPOS), and a final position $WPT_f$, considering all of the static constraints.

Figure 3B:
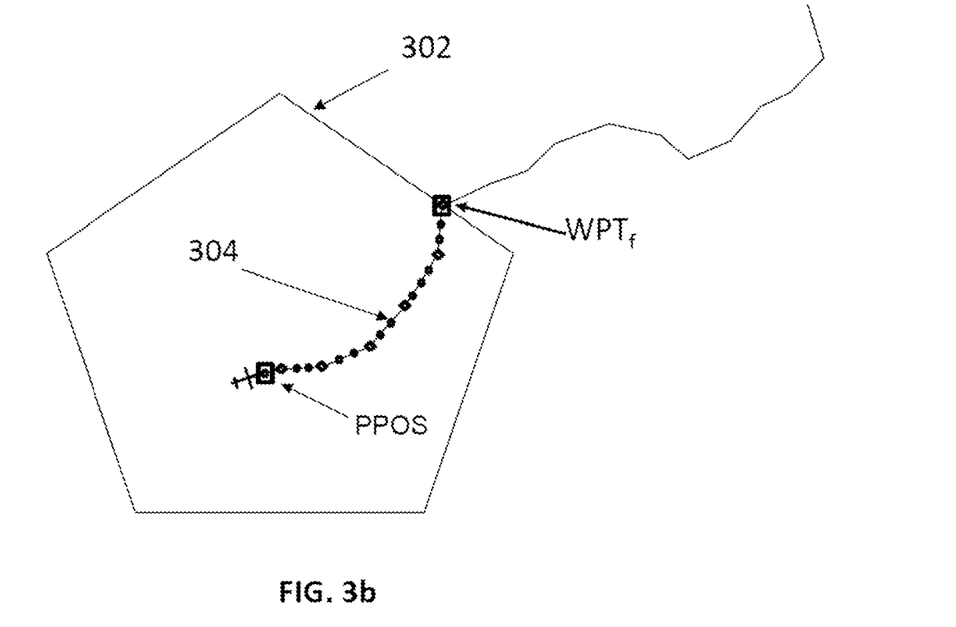

As illustrated in FIG. 3b, the method makes it possible, in the search area, to discretize the trajectory with a (pre)defined discretization step, and to calculate the geographical position of the intermediate points of the trajectory corresponding to the discretization step. At the end of this step, a discretized trajectory (304) is generated, comprising the points of the flight plan and the intermediate points of the trajectory.

Figure 3C:
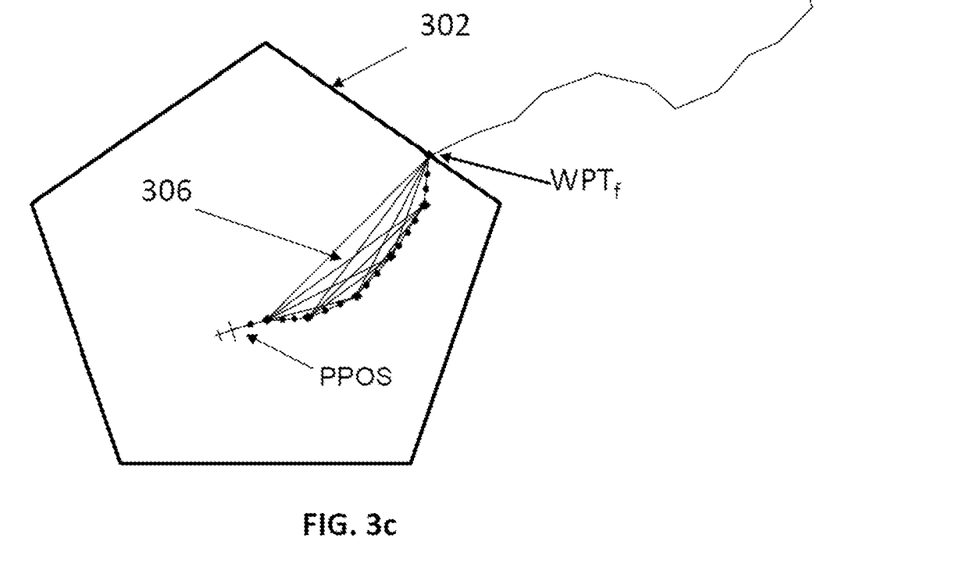
Figure 3D:
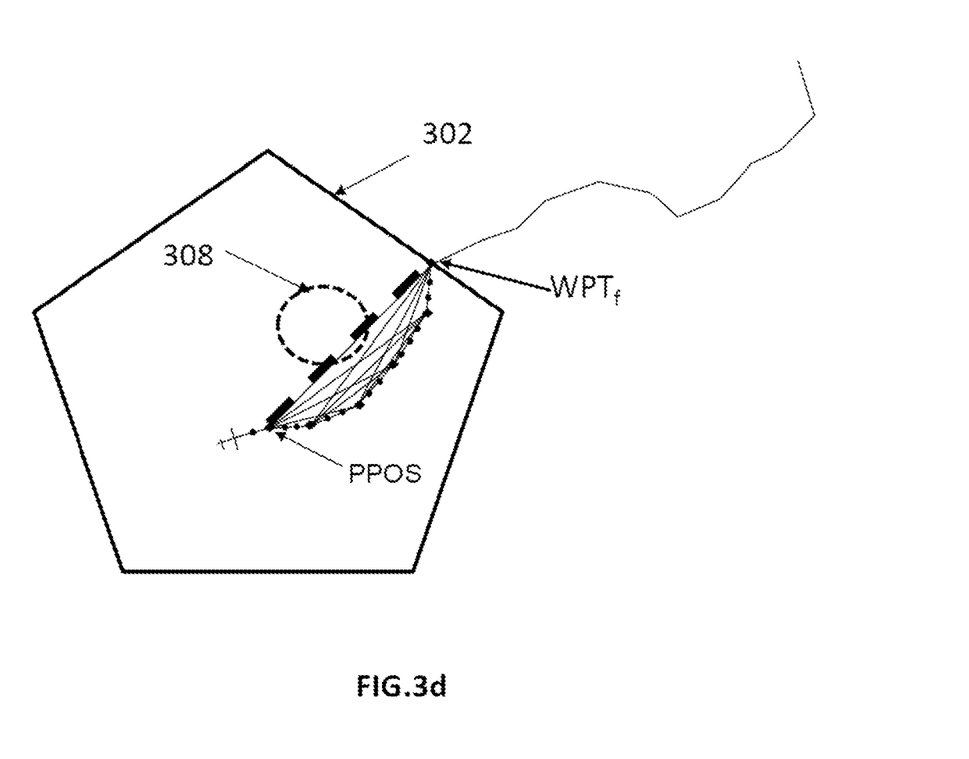
Figure 3E:
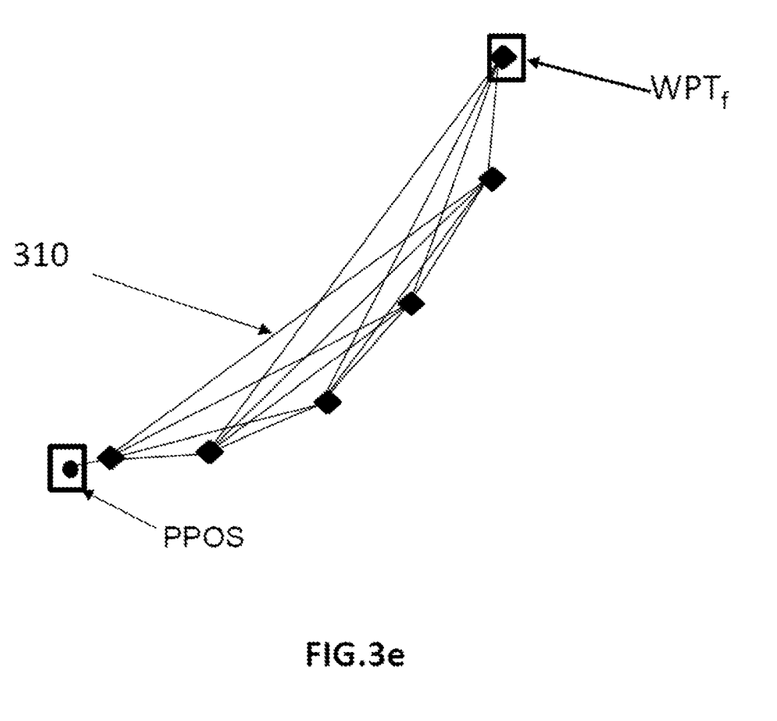

Next, as illustrated in FIG. 3c, the method makes it possible to determine all possible paths (306) for the discretized trajectory, initially without excluding paths of areas to be avoided. To determine the set of all possible paths, the method makes it possible, starting from the first point of the discretized trajectory, to create a first shortcut to the following point of the discretized trajectory and corresponding to one of the possible types of shortcut. The method then reiterates the search for shortcuts from the first point to each of the other following points of the discretized trajectory, and does so up to the final point, thus making it possible to generate, for the first point, a first set of paths with any type of shortcut linking the first point to all of the following points of the discretized trajectory. The method then makes it possible to move to the following point of the discretized trajectory and to apply the same iterative process of linking the second point to all of the other following points of the discretized trajectory, making it possible to generate a second set of paths linking the second point to all of the following points of the discretized trajectory. The method is repeated for all of the points (except the final point) of the discretized trajectory. Once all of the points of the trajectory have been processed in accordance with this principle, in a subsequent step illustrated in FIG. 3d, the method makes it possible to delete all paths intersecting areas to be avoided (308) (that is to say taking into account the changing constraints), and thus to generate, as illustrated in FIG. 3e, a graph that contains only possible paths with shortcuts (310) between the initial point and the final point $WPT_f$.

Figure 4:
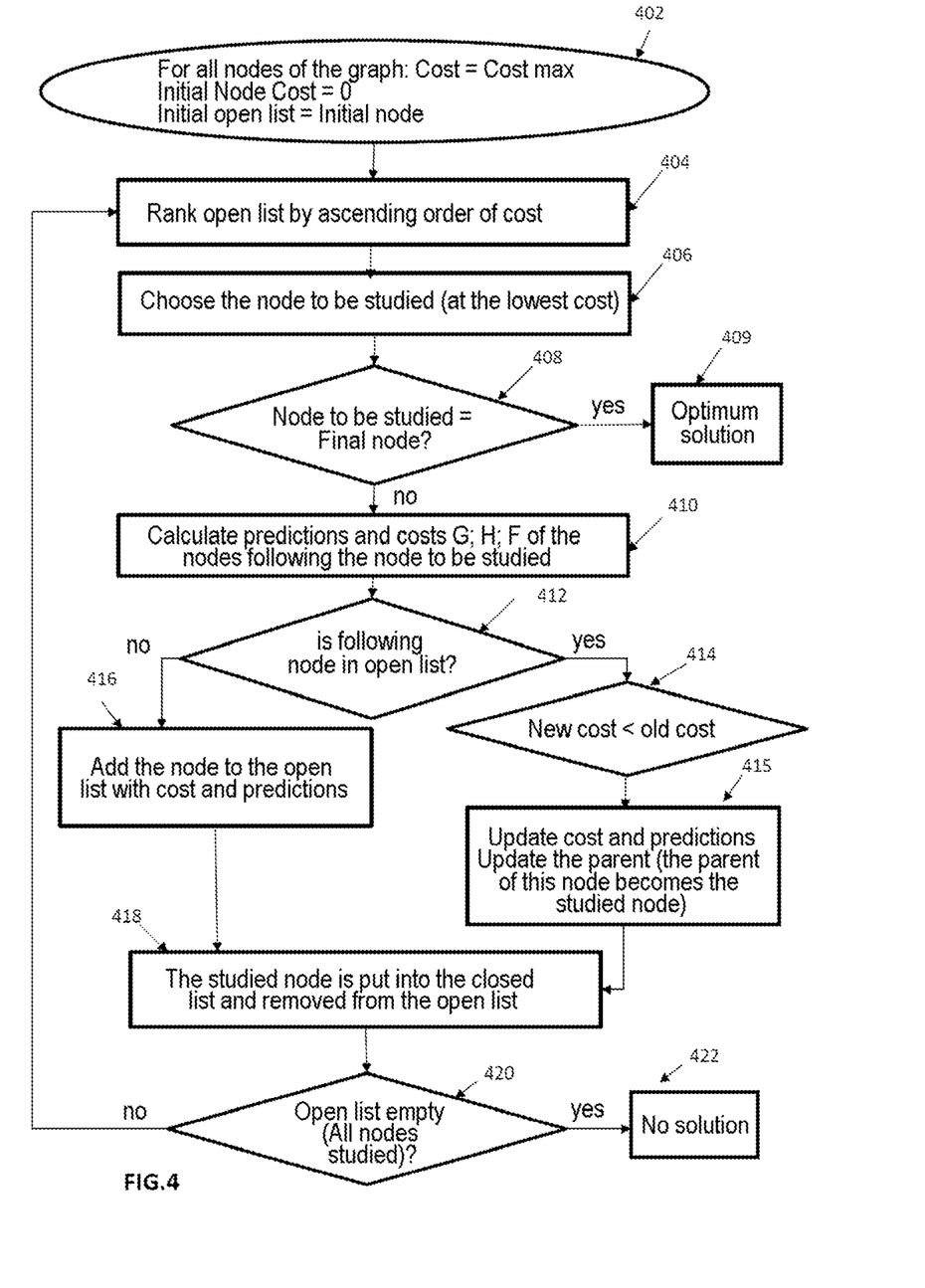
FIG. 4 illustrates the steps of determining the optimum path according to one embodiment.

FIG. 4 details the step (206) of determining the optimum path from among all of the possible paths that were identified in the previous step (202). In one preferred embodiment, this step consists in applying a shortest path algorithm with prediction propagation to the graph generated in the previous step. Predictions are calculated as the graph is run through, and a predictive state of the airplane and an associated cost at each point are estimated at each point.

According to some implementation variants, the algorithm that is applied may be one of the shortest path algorithms known as Dijkstra or A* or Bellman-Ford, to mention only these examples.

The proposed solution makes it possible to consider a set of paths defined by a graph and to propose the optimum path for an aircraft from one node to another node in this graph, that is to say the least expensive path according to the chosen optimization criteria (flight time or distance or fuel consumed or a combination of these criteria), while still considering dynamic constraints. Dynamic constraints may be:
- changing prohibited areas (for example: weather events, no-fly zones);
- changing porous areas (associated probability/cost values) (for example saturation of ATC sector, radar detection military threat areas);
- the performance of the aircraft;
- current atmospheric conditions.

The general principle is that, in each iteration, the method attempts to get closer to the final point of the destination, and will give preference to possibilities that are directly closer in terms of cost to the destination, setting aside all others. All other path possibilities that do not make it possible to get closer to the destination are set aside, but are not deleted. They are put into a list of possibilities to be explored should the solution currently being explored ever turn out to be poor. Specifically, it is not possible to know in advance whether a path will be successful or will be the least expensive. If this path leads to a dead end, the solution becomes unusable.

The algorithm that is implemented will first of all analyze the least expensive paths. If these paths are not successful or else subsequently turn out to be unusable, the method makes it possible to examine the solutions that are set aside. Advantageously, by going back to examine the solutions that are set aside in this way, it is guaranteed that the algorithm will run through all possible paths to find an optimum solution called "solution path".

The method uses two lists that contain nodes of the graph and associated cost and prediction values. The first list, called "open list", will contain all of the nodes of the graph to be studied. As soon as the algorithm operates on a node of the graph, said node is put into the open list (unless it is already there). The second list, called "closed list", contains all of the nodes that, at one time or another, were considered to form part of the path of the solution. This closed list is used to reconstruct the path of the adopted solution. Before moving to the closed list, a node first of all has to move to the open list, because it first of all specifically has to be studied before being considered to be a good candidate for the optimum solution.

In the same way as for any graph, each node has a parent, which in this case is the 'optimum' node via which the algorithm arrived before the current node under consideration. A parent node thus represents the best path between two nodes. The parent node is very important at the end of the algorithm for finding the optimum path by running back through the closed list of parent nodes.

Thus, in the graph, a current node is the grouping of the following information:
- the real cost 'G' of the current node for going from the starting point to the current node, this cost being the sum of the cost of the parent and the cost of the current node;
- the estimated and conservative cost 'H' (in other words of a direct line that does not take into account the constraints) for going from the current node to the destination point;
- the cost 'F' estimated as being the sum of the previous costs 'H' and 'G'; its parent node;
- the neighbor nodes defined by the definitions of the graph; and
- attributes of the current node: fixed attributes (3D position, distance, etc.) and predicted attributes (fuel, time, etc.).

To determine whether a node is likely to form part of the solution path, the method has to quantify the three values G, H and F as well as the predicted attributes. The method makes it possible to analyze each of the neighbor nodes of the current node in order to determine which one has the most chance of forming part of the solution path.

The search for the path begins with a first node by studying all of its neighbors; by calculating the various costs G, H and F, and by choosing the best one to continue.

Each studied node is put into the open list and the best one from this list moves into the closed list; it will be used as a base (parent node) for the following search.

Thus, in each iteration, the method makes it possible to view, among all of the nodes that have been studied (and that have not yet been chosen), the one that has the best quality (minimum cost 'F'). The algorithm stops when the destination has been reached with the lowest cost value 'F' out of all of the nodes or else when all of the solutions set aside (open list) have been studied and none of them has turned out to be good (the case where there is no optimum solution).

Once the destination has been reached, the method will reconstruct the path by following, each time, the parent nodes present in the closed list, and goes back through the sequence until it reaches the starting parent node.

Thus, to determine the optimum path taking into account all of the paths with shortcuts, the method illustrated by the steps in FIG. 4 consists in:
- Step (402): initializing:
  - the open list with the starting node;
  - the cost of all of the nodes of the graph with a cost 'MAX',
- Step (404): classifying the open list in ascending order of cost;
- Step (406): selecting the node with the lowest cost as node to be studied;
- Step (408): determining whether the node to be studied is the final node. If so, the optimum solution is found (409); if not, the method continues;
- Step (410): calculating, for each node following the node to be studied, the predictions and the various costs G, H, F;
- Step (412): For each following node, determining whether or not the node is present in the open list and at what cost;
- Step (414): if the following node is already in the open list, and if the calculated cost F is lower than that already present in the open list;
- Step (415): updating the cost and prediction information for the node in the open list, and updating the parent of this node by replacing it with the node to be studied;
- Step (416): if the following node is not present in the open list, it is added thereto with its cost and prediction information;
- Step (418): putting the node to be studied into the closed list and removing it from the open list;
- Step (420): determining whether there are any nodes remaining in the open list. The method is iterated for as long as the open list is not empty;
- Step (422): when all of the nodes have been studied (open list empty), the method ends with no optimum solution found.

Figure 5:
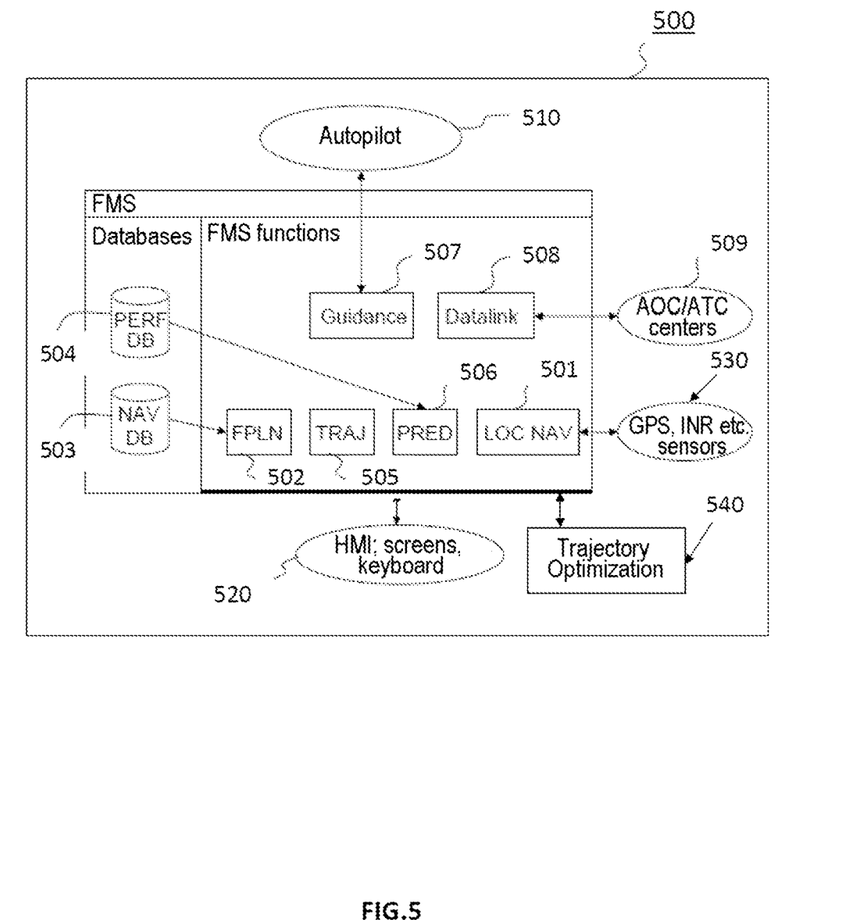
FIG. 5 illustrates a structure of a flight management system for implementing the device and the method of the invention.

FIG. 5 illustrates a structure of a flight management system for implementing the method of the invention. For example, the system may be an FMS flight management system (500), comprising the components designed to perform the known functionalities and also incorporating a trajectory optimization system (540) for implementing the method of the invention.

A known FMS system has a human-machine interface (520) comprising for example a keyboard and a display screen, or else simply a touch display screen, and at least modules for performing the following functions:
- Navigation (LOCNAV) (501), for performing optimum location of the aircraft on the basis of geolocation means (530), such as geopositioning using satellites or GPS, GALILEO, VHF radio navigation beacons and inertial measuring units. This module communicates with the abovementioned geolocation devices;
- Flight plan (FPLN) (502), for inputting geographical elements forming the skeleton of the route to be followed, such as the points imposed by the departure and arrival procedures, the waypoints and the airways, as they are known;
- Navigation database (NAVDB) (503), for constructing geographical routes and procedures from data contained in the bases relating to the points, beacons, interception or altitude legs, etc.;
- Performance database (PERFDB) (504), containing the aerodynamic and engine performance parameters of the aircraft;
- Trajectory (TRAJ) (505), for constructing an optimized and continuous 4D trajectory on the basis of the points of the flight plan and the associated constraints, complying with the performance of the aircraft and the confinement constraints (RNP);
- Predictions (PRED) (506), for providing predictions (altitude, time, fuel) on all of the points of the flight plan;
- Guidance (GUID) (507), for providing commands for guiding the aircraft along the lateral plane, the vertical profile and the speed profile;
- Digital data link (DATALINK) (508) for communicating with control centers and other aircraft (509).

The present invention may thus be implemented using hardware and/or software elements. It may be available in the form of a computer program product on a computer-readable medium. The medium may be electronic, magnetic, optical or electromagnetic. In terms of hardware, the computer for performing the described method may be implemented on a tablet or laptop (or on any other computing means external to the avionics, for example via remote access means). It may also be based on computing infrastructures on the ground, based on distributed or massively parallel architectures. In one embodiment, the method is implemented by a computer comprising code instructions for performing one or more of the steps of the method when said program is executed on a computer. In one embodiment, the system for implementing the invention comprises a computer-readable storage medium (RAM, ROM, flash memory or another memory technology, for example a disk medium or another computer-readable non-transitory storage medium) coded with a computer program (that is to say a plurality of executable instructions) that, when it is executed on a processor or a plurality of processors, performs the functions of the embodiments described above. By way of example of hardware architecture appropriate for implementing the invention, a device may include a communication bus to which a central processing unit (CPU) or microprocessor are connected, which processor may be "multicore" or "manycore"; a read-only memory (ROM) able to contain the programs necessary for implementing the invention; a random access memory (RAM) or cache memory containing registers suitable for recording variables and parameters that are created and modified during the execution of the abovementioned programs; and an I/O ("input/output") or communication interface suitable for transmitting and for receiving data.

If the invention is implanted in a reprogrammable computing machine (for example an FPGA circuit), the corresponding program (that is to say the sequence of instructions) may be stored in or on a storage medium that is removable (for example an SD card or a mass storage means, such as a hard disk, for example an SSD) or that is non-removable, that is volatile or non-volatile, this storage medium being readable in part or in full by a computer or a processor. The computer-readable medium may be transportable or communicable or mobile or transmissible (i.e. via a 2G, 3G, 4G, Wi-Fi, BLE, fibrer-optic or other telecommunication network).

The reference to a computer program that, when it is executed, performs any one of the previously described functions is not limited to an application program running on a single host computer. On the contrary, the terms computer program and software are used here in a general sense to refer to any type of computer code (for example, application software, firmware, microcode, or any other form of computer instruction, such as web services or SOA or via programming interfaces API) that may be used to program one or more processors so as to implement aspects of the techniques described here. The computing means or resources may notably be distributed ("cloud computing"), possibly with or using peer-to-peer and/or virtualization technologies. The software code may be executed on any suitable processor (for example a microprocessor) or processor core or a set of processors, whether these are provided in a single computing device or distributed between several computing devices (for example such as possibly accessible in the environment of the device). Security technologies (cryptoprocessors, possibly biometric authentication, encryption, chip card, etc.) may be used.

The invention claimed is:

1. A computer-implemented method for optimizing a mission of an aircraft, the aircraft having a predefined flight plan between a starting point and an arrival point, the predefined flight plan comprising a set of waypoints, the method comprising steps of:
   (a) calculating, for the aircraft with an on-board computer, a reference trajectory between the starting point and the arrival point based on input data, the reference trajectory comprising a set of segments and of intermediate points linking the segments of the reference trajectory;
   (b) defining a search area with the on-board computer in the reference trajectory between an initial position and a final position to be reached for the search area;
   (c) generating with the on-board computer between the initial position and the final position of the search area a discretized trajectory according to a predefined discretization step, the discretized trajectory comprising waypoints of the predefined flight plan and intermediate points of the reference trajectory included in segments connecting waypoints, considering predefined fixed constraints;
   (d) controlling the on-board computer to implement an iterative process on the discretized trajectory that includes creating for each point a set of paths with shortcuts between said each point and each of the other next points of the discretized trajectory up to the final position, a shortcut constituting a flight segment between two points, the two points being waypoints and/or intermediate points;
   (e) deleting with the on-board computer the paths from among the created sets of paths with shortcuts, that do not respect changing constraints, thereby generating a graph with each point as a node and a path with a shortcut as an arc between two nodes, the graph identifying all possible paths with shortcuts between the initial position and the final position that respect the predefined fixed constraints and the changing constraints;
   (f) controlling the on-board computer to determine the graph, all nodes to be a likely candidate for an optimum path according to at least an optimization criterion, each node being quantified by cost parameters; and
   (g) constructing an optimum path with selected candidates and displaying on an interface on board the aircraft said optimum path optimizing a cost of the mission of the aircraft in the search area.

2. The method as claimed in claim 1, wherein the step of creating a of paths with shortcuts consists in constructing the graph comprising a set of nodes and arcs, the nodes representing crossing points between the initial position and the final position of the search area, the arcs representing shortcuts.

3. The method as claimed in claim 2, wherein the step of determining candidates consists in applying a shortest path algorithm to the graph.

4. The method as claimed in claim 3, wherein the shortest path algorithm is a Dijkstra algorithm.

5. The method as claimed in claim 1, wherein the search area is a space corresponding to an air traffic control sector or to an area defined between two characteristic points of the predefined flight plan or to a space between two points chosen by an operator.

6. The method as claimed in claim 1, wherein the step of determining candidates consists in calculating real and predicted costs for each candidate node.

7. The method as claimed in claim 1, wherein the optimization criterion is a single criterion, notably a criterion for optimizing fuel consumption or a criterion for optimizing time or a criterion for optimizing distance.

8. The method as claimed in claim 1, wherein the optimization criterion is a multiple criterion taking into account various costs.

9. The method as claimed in claim 1, wherein the initial position is a current position of the aircraft.

10. The method as claimed in claim 1,
    wherein the predefined fixed constraints comprise one or more the following: airline constraints, client constraints, characteristics of the aircraft, and a performance of the aircraft; and wherein the changing constraints are linked to an environment.

11. A non-transitory computer program product, said non-transitory computer program product comprising non-transitory computer readable medium with instructions for performing the steps of the method as claimed in claim 1 when said non-transitory computer program product is executed on a computer.

12. A device for optimizing a mission of an aircraft, the aircraft having a predefined flight plan between a starting point and an arrival point, the predefined flight plan comprising a set of waypoints, the device comprising:
    navigation sensors configured to determine positions of the aircraft;
    a flight management system, including a computer, configured to:
    calculate a reference trajectory between the starting point and the arrival point based on input data, the reference trajectory comprising a set of segments and of intermediate points linking the segments of the reference trajectory;
    define a search area in the reference trajectory between an initial position and a final position to be reached for the search area;
    generate between the initial position and the final position of the search area a discretized trajectory according to a predefined discretization step, the discretized trajectory comprising waypoints of the predefined flight plan and intermediate points of the reference trajectory included in segments connecting waypoints, considering predefined fixed constraints;
    control implementation of an iterative process on the discretized trajectory, consisting in creating for each point a set of paths with shortcuts between said each point and each of the other next points of the discretized trajectory up to the final position, a shortcut constituting a flight segment between two points, the two points being waypoints and/or intermediate points;
    delete, from among the created sets of paths with shortcuts, the paths that do not respect changing constraints, thereby generating a graph with each point as a node and a path with a shortcut as an arc between two nodes, the graph identifying all possible paths with shortcuts between the initial position and the final position that respect the predefined fixed constraints and the changing constraints;
    control determination from the graph of all nodes to be a likely candidate for an optimum path according to at least an optimization criterion, each node being quantified by cost parameters; and
    construct said optimum path with selected candidates; and
    an interface on board the aircraft configured to display said optimum path optimizing the mission of the aircraft in the search area.

13. The device as claimed in claim 12,
    wherein the predefined fixed constraints comprise one or more the following:—airline constraints, client constraints, characteristics of the aircraft, and a performance of the aircraft; and
    wherein the changing constraints are linked to an environment.

* * * * *